April 25, 1961 Re. 24,975

HEDWIG ALICE WALLIMANN, NÉE HUNZIKER

ROTARY MACHINE

Original Filed May 6, 1954 4 Sheets-Sheet 1

INVENTOR

HEDWIG ALICE WALLIMANN

NÉE HUNZIKER by Walter S. Bleston

ATTORNEY

April 25, 1961 Re. 24,975

HEDWIG ALICE WALLIMANN, NÉE HUNZIKER

ROTARY MACHINE

Original Filed May 6, 1954 4 Sheets-Sheet 2

INVENTOR

HEDWIG ALICE WALLIMANN
NÉE HUNZIKER
by Walter S. Phelston
ATTORNEY

April 25, 1961 Re. 24,975

HEDWIG ALICE WALLIMANN, NÉE HUNZIKER

ROTARY MACHINE

Original Filed May 6, 1954 4 Sheets-Sheet 3

INVENTOR:

HEDWIG ALICE WALLIMANN
NÉE HUNZIKER
by Walter S. Bleston
ATTORNEY

April 25, 1961 Re. 24,975

HEDWIG ALICE WALLIMANN, NEE HUNZIKER

ROTARY MACHINE

Original Filed May 6, 1954 4 Sheets-Sheet 4

INVENTOR
HEDWIG ALICE WALLIMANN
NEE HUNZIKER
by Walter S. Bleston
ATTORNEY

United States Patent Office

Re. 24,975
Reissued Apr. 25, 1961

24,975

ROTARY MACHINE

Hedwig Alice Wallimann, née Hunziker,
Zurich, Switzerland

Original No. 2,796,837, dated June 25, 1957, Ser. No. 428,056, May 6, 1954. Application for reissue June 23, 1959, Ser. No. 822,405

Claims priority, application Switzerland May 16, 1953

15 Claims. (Cl. 103—121)

Matter enclosed in heavy brackets [ ] appears in the original patent but forms no part of this reissue specification; matter printed in italics indicates the additions made by reissue.

The present invention relates to a rotary machine with sliding sealing elements, and has the primary object of providing a machine of this type wherein the said sealing elements or vanes secure a reliable sealing effect in every position thereof.

It is another object of the present invention to provide a machine of this type which relies exclusively on the structural shape of its cooperating components, and has no recourse to elastic deformation thereof under the action of centrifugal force.

It is yet another object of the present invention to provide at least a multiple line contact, preferably however, practically an area contact between the curved stationary surface and the inner ends of the said sealing elements cooperating therewith.

It is still another object of the present invention to secure an automatic separation of the lubricant used for the lubrication of mutually moving contacting surfaces of components of a machine of this type from a medium of lower specific weight pumped by the same, owing to the action of centrifugal force.

With these and other objects in view, I provide a rotary machine with sliding sealing elements comprising in combination: a stationary structure *which, as shown in Fig. 1, may include an* outer mantle, a closure lid fixedly attached to the said mantle *and together therewith forming a bipartite protective housing,* a rotatable casing arranged inside the said mantle and journalled therein and in the said closure lid, a stationary guide drum *mounted on said structure and* arranged eccentrically inside the said rotatable casing with clearance from the inner wall surface thereof even at the nearest point, shaft portions extending axially from both ends of the said stationary drum through the said rotatable casing, an inlet duct and a discharge duct being provided in the said shaft portions and communicating with an inlet part and a discharge part, respectively, issuing from the said drum into the eccentrical annular space enclosed between the said rotatable casing and stationary drum, vanes slidably guided in radial slots in the circumference of the said rotatable casing, bridge pieces rigid by connecting diametrically opposite vanes with one another and going with ample clearance round the adjacent shaft portion extending from said stationary drum, and inserts fulcrumed in the end faces of the said vanes for rocking motions about axes parallel to the axis of the said rotatable casing and contacting the circumference of the said drum, the said eccentrical annular space being divided into separate compartments sealed from one another by the said sliding vanes and inserts thereof, and, upon rotation of the said casing, *periodically increasing and decreasing as to their capacities* [firstly increasing in volume from the said inlet part onwards, and then decreasing in volume towards the said discharge part], the said drum having a substantially elliptical cross section with the major axis at right angles to the eccentrical offset of the said stationary drum with respect to the said rotary casing, and the sealing faces of the said inserts *where* contacting the surface of the said stationary drum, *having* in any position at least [with] a multiple line contact but preferably [with] an area contact, [the] *any* gap between the said sealing faces and the surface of the drum being everywhere smaller than the thickness of the film of lubricant applied to it.

The said bridge pieces establishing rigid connection between diametrically opposite vanes are either C-shaped or annular, and have an aperture surrounding the said shaft portion, the diameter of which exceeds the diameter of the said shaft portion so much that the centre of the said aperture coincides with the axis of the said drum. Preferably the said inserts protrude at least partly beyond the end faces of the said inserts facing towards the said drum.

Recesses parallel to their axis of rocking may be provided in the sealing faces of the said inserts contacting the surface of the said drum. The ratio of offset of the centers of the said casing and drum to half the distance between diametrically opposite vanes is preferably equal to, or smaller than, 0.2 By this choice of eccentricity the differences in the curvatures of the drum surface as caused by the elliptical shape of the drum are comparatively small, and the sealing faces of the inserts can be better adapted to the same. Moreover the width of the sealing face can be so selected that the gap formed at the points of greatest curvature between the drum and the segment has such a small width, that it can be compensated by the film of lubricant. In some cases one is, however, tied to a certain width of the vanes or inserts, respectively, which is to be selected at least equal to the full stroke. Since in this construction the vanes engage into slots of the casing, and behind the vanes there are air spaces, the volume of which varies periodically upon rotation of the casing a varying pressure is applied to the rear face of the vanes. This can be obviated in such a manner that the air spaces in the casing behind the vanes are put into communication with one another by means of conduits provided in the casing, for the purpose of equalization of pressure.

The invention will be explained hereinafter with reference to embodiments illustrated by way of example in the accompanying drawings, in which.

Figure 1:
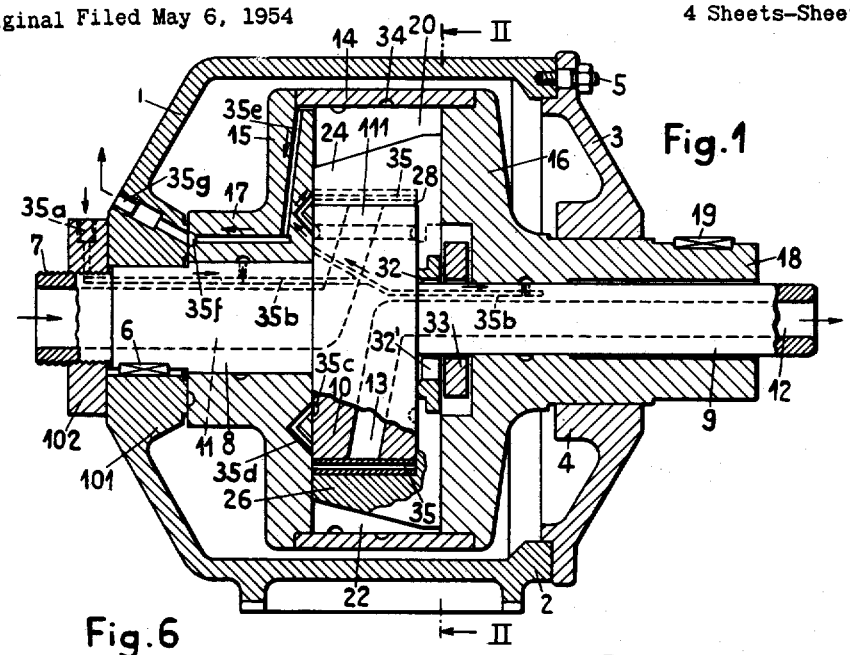
Figs. 1 to 3 show an embodiment of a rotary machine with sliding sealing elements or vanes according to the invention, Fig. 1 being a section along the line I—I of Fig. 2, Fig. 2 being a section along the line II—II of Fig. 1, and Fig. 3 being an exploded perspective view showing individual components.

In the Figs. 1 to 4, a stationary cylindrical mantle 1 is open on the right hand side, and has a foot 2. The mantle is provided with a covering lid 3 which has an inwardly directed hub 4. Of the screws 5 for the fixing of the lid 3 to the mantle 1, one only is shown in Fig. 1. The mantle 1 is provided with an inwardly directed hub 101. Two shaft portions 8 and 9 are passed through bores of the hubs 101 and 4, respectively. Both shaft portions 8, 9 are rigidly connected to the eccentrically mounted drum 10. By means of the key 6, the screw thread 7 and the nut 102, the shaft portion 8, and thereby also the drum 10, are fixed in the hub 101. In the shaft portion 8, there is a conduit 11, which issues at 111 on the circumference of the drum 10. The shaft portion 9 contains likewise a conduit 12, which issues at 13, i.e. on the side opposite the orifice 111, of the drum 10 on the circumference of the drum 10. *The orifices are located on the drum surface at points spaced from each other as conventional in machines of the type to which my invention relates.* Around the drum 10 a cylindrical casing 14 is arranged, the axis of which coincides with the axis of the shaft portions 8 and 9, and which is journalled with its closure lids 15 and 16 and its hubs 17 and 18 rotatably on the shaft 8, 9. The key 19 on the hub 18 serves for keying-on a belt pulley (not shown). The hub 18 may alternatively be coupled directly to a driving motor, a packing gland not being absolutely necessary. *The mantle 1 and lid 3 may be omitted as they merely serve as a protection to prevent people from inadvertently contacting the rotating parts of the device. In that event, the rotary casing may be journalled only on shaft portions 8 and 9 directly mounted on another suitable stationary structure.*

Figure 2:
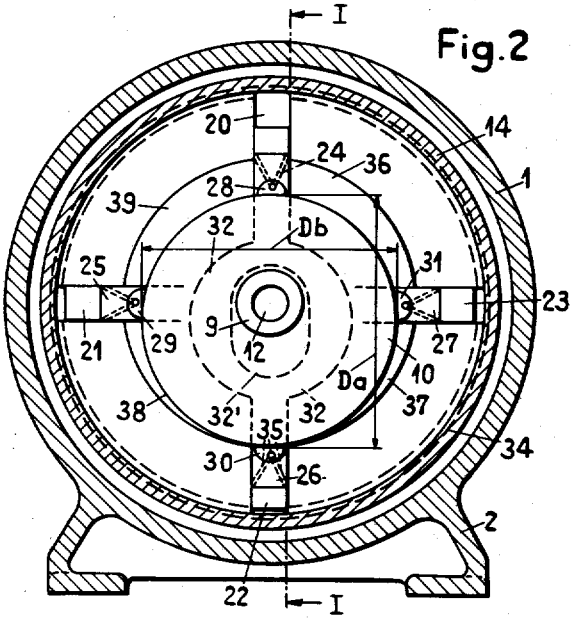
Figure 3:
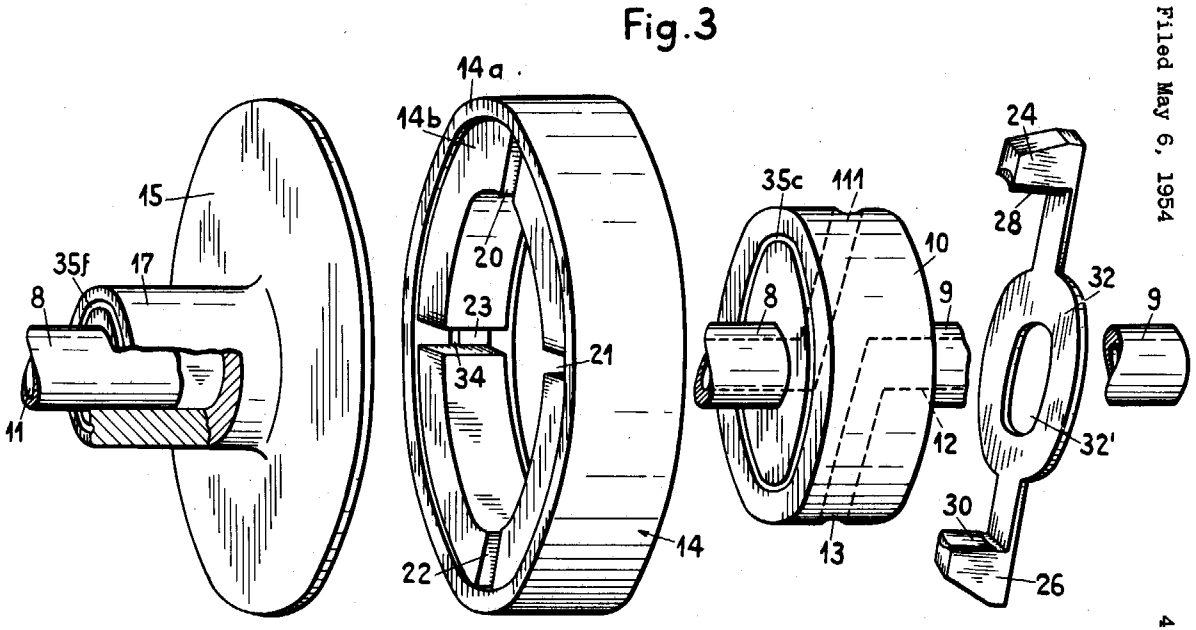

The cylindrical casing 14 has four slots 20, 21, 22, 23, offset uniformly 90° with respect to one another, and all of them lying at an equal distance from the axis of the casing. In these slots, vanes 24, 25, 26, 27, are arranged. In the ends of these vanes facing the drum, recesses are provided into which inserts 28, 29, 30, 31, e.g. of metal or of artificial material, are pushed, which inserts perform rocking movements about a virtual axis parallel to the axis of the casing. As will be seen in Figs. 1 to 3, the vanes 24, 26 and 25, 27 lying opposite to one another, respectively, are rigidly connected with one another by a ring 32, 33, respectively, the central planes of the said vanes passing in any position thereof through the axis of the said casing. The ring 32 has for example an elongated hole 32' through which the shaft portion 9 is passed. In the same manner the ring 33 is shaped. A ring conduit 34 puts the air spaces located at the outer ends of the vanes 24, 25, 26, 27 into communication with one another for the purpose of equalisation of pressure. Various conduits serve for the supply of the lubricant. The latter is supplied at 35a (Fig. 1), is passed through the conduits 35b to the bearings of the two shaft portions 8, 9 and also to the sliding surfaces between the drum 10 and the casing 14, whereby part of the lubricant gets into the ring conduit 35c (Figs. 1, 3), and from there through the conduits 35d of the lid 15 to the bores 35 (Figs. 1, 2, 4) of the rocking inserts. Owing to the action of centrifugal force the lubricant eventually gets to the peripheral outer sides of the conduits and from there through the aperture 35e in the lid 15 to the ring conduit 35f (Figs. 1, 3) of the hub 17, where it leaves the machine at 35g. The path of the oil as described is indicated in Fig. 1 by arrows. In order to ease the production of the lubrication conduits in the rotory casing the latter may be composed of an outer portion 14a and an inner portion 14b, as shown in Fig. 3. In the embodiment represented the space between the rotary casing 14 and the stationary drum 10 is subdivided by the vanes 24, 25, 26, 27 or by their inserts 28, 29, 30, 31, respectively, into four compartments 36, 37, 38, 39 which are sealed against one another. Instead of four vanes 24, 25, 26, 27 two only, or more than four vanes could be provided.

Figure 4:
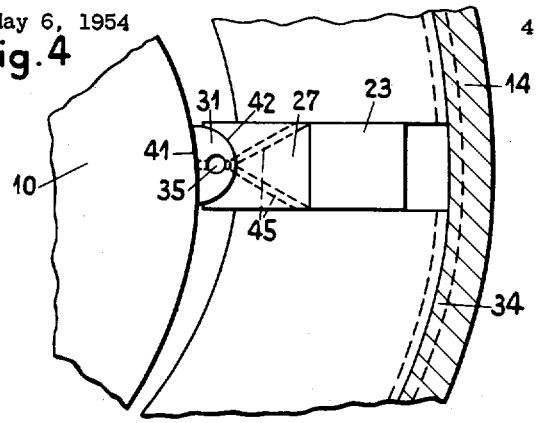
Figs. 4 and 5 show on a larger scale than the Figs. 1 and 2, two embodiments of vanes with rocking inserts.
Figure 5:
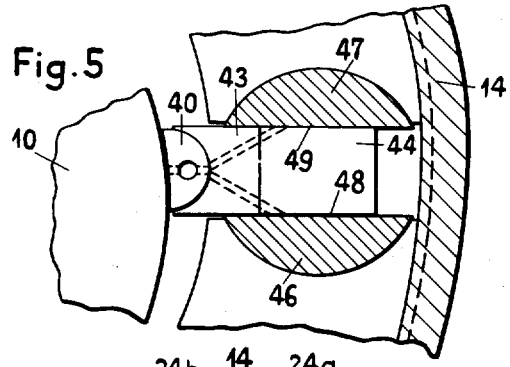

In the Figs. 4 and 5 two embodiments of vanes with rocking inserts are shown by way of example, on a larger scale. In the embodiment according to Fig. 4 the vane 27 slides in the groove 23 provided in the casing 14. For the supply of the lubricant e.g. of oil, to the sealing faces 41 of the insert 31, the conduits 45 are provided. The insert 31 itself is capable of rocking in the vane 27.

In some cases it may offer some difficulties to mill faultlessly fitting grooves into the casing. On the other hand it is easier in certain circumstances to drill for example circular bores and to establish the guide by two bars positioned at a distance accurately corresponding to the width of the vanes, as shown in Fig. 5. The vane 43 and the sealing insert 40 correspond to the components 27 and 31, respectively, of Fig. 4. However, the groove 44 for the guiding of the vane 43 is formed in that into the casing 14 a circular bore is drilled, into which two guide bars 46, 47, constructed as cylinder segments, are inserted, the sliding faces 48, 49 of which have a distance from one another which is adapted to the width of the vane 43 so as to provide a sealed guide for it.

In the embodiments of the inserts 31 and 40, respectively, shown in Figs. 4 and 5 the sealing faces 41 (Fig. 4) of these inserts are curved steadily for example shaped as parts of circular cylinders. Since the insert 31 (Fig. 4) in the recess 42 of the vane 27 is capable of rocking, it adapts itself by rocking as far as possible to the curvature of the surface of the drum 10, so that between the drum surface and the sealing face of the insert there is practically an area seal established at least partly, i.e. at least a multiple line contact. The vane 27 has conduits 45 for the lubrication of the sealing and sliding face 41. These conduits 45 are connected to the lubrication conduit 35, which has an aperature also on the sealing face 41 of the insert 31 in order that the supply of lubricant to the sliding face 41 may be secured.

Figure 8:
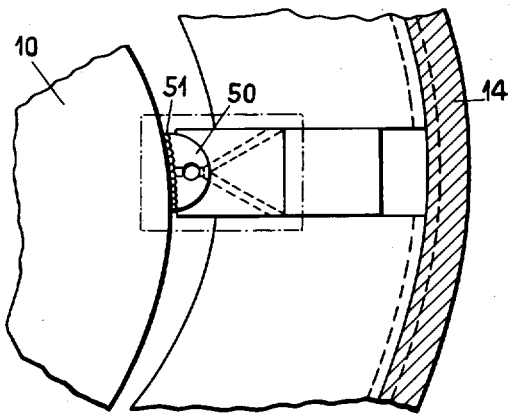
Figs. 8 to 14 show, on a larger scale than the Figs. 1 and 2, seven different embodiments of the sealing faces of the rocking inserts.
Figure 9:
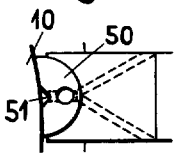
Figure 10:
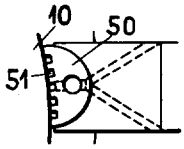
Figure 11:
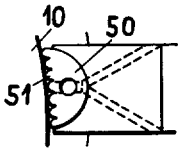
Figure 12:
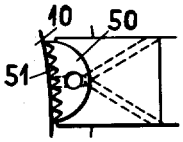

However, it is not necessary to have the sealing faces of the inserts, as shown in Figs. 4 and 5, steadily curved. The sealing faces may alternatively have recesses. Such embodiments are shown by way of example in the Figs. 8 to 12. In the embodiment according to Fig. 8 the sealing face 51 of the insert 50 is formed undulating. The crests of the waves from an envelope surface which is adapted to the drum surface so that at any time at least some wave crests slide upon the drum surface so that a multiple line contact is secured, and a similarly efficient seal is attained as with an area sealing according to Figs. 4 and 5. Other shapes of sealing faces having recesses are shown in Figs. 9 to 12. In Fig. 9 there is a triangular recess 51 provided. In the insert 50 according to Fig. 10 the recesses are formed as grooves 51. In the embodiment according to Fig. 11 the sealing face has a domed shape, the apices of the domes sliding on the drum surface delimiting an envelope surface so that at least some dome apices slide at the same time on the drum surface, and thereby secure a multiple line contact. Fig. 12 shows an embodiment in which triangular recesses are provided in a zig-zag shape arrangement. The edges sliding on the drum surface are arranged, here too, in such a manner that at any time several such edges slide upon the piston surface, and secure a multiple line seal. Otherwise the construction of the vanes in Figs. 8 to 12 corresponds to that of Fig. 3. In the Figs. 9 to 12 for the sake of simplicity merely that part is shown which in Fig. 8 is enclosed in a chain-dotted frame.

The advantage of the embodiment according to the Figs. 8 to 12 consists in that the lubricant is particularly well retained between the drum surface and the sealing faces of the inserts, and is thrown off merely in small quantities owing to pressure differences between two adjacent compartments.

Figure 6:
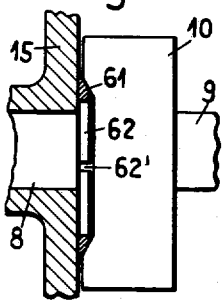
Figs. 6 and 7 show in simplified representation, on a smaller scale than Figs. 1 and 2, two modifications of a rotary machine according to the Figs. 1 to 3.

It may moreover be of advantage from the point of view of production to give the drum 10 in the axial direction a small play. The sealing between the frontal face of the drum and the bearing lid 15 can be attained then by means of frusto-conical, piston ring which is slotted at one point, preferably on the suction side. Such an embodiment is diagrammatically illustrated in Fig. 6. The drum 10 has on the side facing the bearing lid 15 conical recess 61. The piston ring 62 slotted at 62 is dimensioned slightly larger and is inserted into the conical recess 61, so that the piston ring 62, owing to its resilient force, produces a sufficient seal. An additional advantage consists in that the piston ring 62 adjusts, and readjusts, itself automatically in operation.

Figure 7:
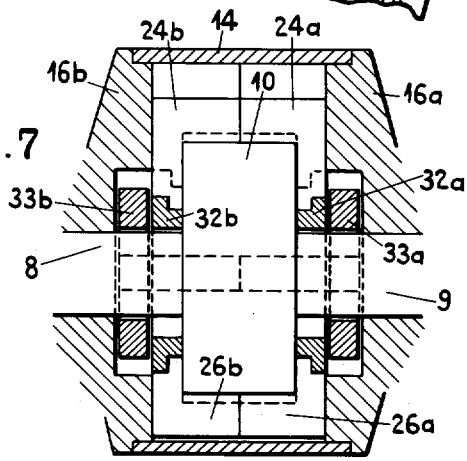

In many cases it may prove convenient to continue the grooves provided in the casing into the lateral closure lids for the purpose of a more stable guidance of the vanes, and to select the axial length of the vanes so that they extend into the grooves of the closure lids and seal-up there. Moreover it can be advantageous to construct the vanes in two or more parts in the direction of rotation of the casing, the parts of the vanes abutting on one another, and opposite end portions of part-vanes each being rigidly connected with one another by means of a bridge. An embodiment with subdivision of the vanes in the direction of rotation of the casing is illustrated in Fig. 7. The components 8, 9 and 10 correspond to the same components in Figs. 1 and 2. The cylindrical casing 14 has two closure lids 16a and 16b. Each vane is subdivided in the axial direction into two parts 24a, 24b and 26a and 26b, respectively, the associated parts abutting on one another. Each two diametrically opposite vanes are rigidly connected to one another by means of the four rings 32a, 33a, 32b and 33b, respectively.

Figure 13:
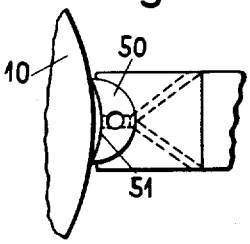
Figure 14:
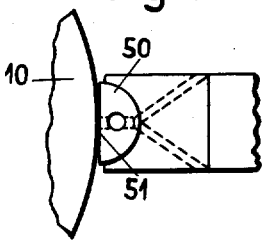

From the eccentricity between drum and casing on the one hand, and the rigid connection between two diametrically opposite vanes provided with the inserts on the other hand it results that the profile of the drum must deviate slightly from the circular shape, if a faultless seal, particularly practically an area seal or a multiple line seal, respectively is to exist between the inserts and the drum surface in any position of the casing. In the embodiment according to Fig. 2 for example the horizontal drum diameter Db is slightly larger than the vertical drum diameter Da. The difference between these two magnitudes Da and Db is, however, so small that it does not find any expression in the drawing. The particularly convenient shape of the drum profile results in connection with the eccentricity between drum and casing and the selected shape of the sealing face of the inserts. By this mutual adaptation practically in any position of the vanes a faultless seal between the compartments is attained. From the foregoing considerations it follows also that the curvature of the drum surface is not constant and that consequently with given conditions of curvature of the sealing faces of the inserts a varying play between these sealing faces and the drum surface results upon rotation of the casing. In order to secure as extensive as possible an area seal or a multiple line seal, respectively, it is of advantage, to shape the seal faces of the inserts and the drum surface in such a manner, that at a given distance of two vanes lying diametrically opposite to one another the said play, i.e. the deviation between the sealing face and the drum surface is as a maximum of such a dimension that it can be compensated by the film of lubricant. It is clear that as good as possible an adaptation of the two faces, namely of the sealing face of the inserts on the one hand, and of the drum surface on the other hand, can be attained by various measures. For example the inserts could be given a certain curvature, say a circular curvature. Then the optimum profile of the drum can be ascertained by calculation or empirically. With a circular curvature of the sealing faces of the inserts, that is with a constant radius of curvature thereof, two limiting cases can be distinguished. The radius of the sealing face may be at least equal to the largest radius of the curvature of the drum surface, or the radius of the sealing faces may correspond as a maximum to the smallest radius of curvature of the drum surface. Therefrom result—in exaggerated representation—the embodiments illustrated in the Figs. 13 and 14. In Fig. 13 the radius of curvature of the sealing face 51 of the insert 50 is smaller than the radius of curvature of the drum 10. In this case the end portions of the sealing faces 51 slide on the drum surface. In the embodiment according to the Fig. 14 the radius of curvature of the sealing face 51 is larger than that of the drum surface, i.e. substantially the middle portions of the sealing face 51 slide upon the drum surface. Quite generally the conditions can be so selected, that when the radius of the curvature of the sealing face of the inserts is not constant, the largest radius of curvature of the sealing faces of the inserts is a maximum as large as the smallest radius of curvature of the drum surface, or that the smallest radius of curvature of the sealing faces of the inserts is at least as large as the largest radius of curvature of the drum surface.

Finally it should be mentioned that it is advantageous to let the inserts slightly protrude beyond the end margins of the vanes as will be seen particularly in Figs. 3 to 5. Thereby it can be attained that, at least over the better part of a revolution, the sealing faces of the inserts only keep in contact with the drum surface, and not parts of the vanes themselves.

The manner of operation of the rotary machine as illustration in the Figs. 1 and 2 and described hereinabove is as follows:

The cylindrical casing 14 may be driven from a belt pulley mounted on the hollow shaft 18, or directly. Alternatively it may be coupled directly, in certain circumstances without the use of packing glands, to the driving motor (not shown). From Fig. 2 it will be seen that the space between the drum 10 and the casing 14 is subdivided by four vanes 24, 25, 26, 27 or by their inserts 28, 29, 30, 31, respectively, into four compartments, the capacities of which periodically increase and diminish upon rotation of the casing. Through the conduit 11 air, for example, is aspirated. The same is compressed in the compartments, and expelled through the conduit 12. As perfect as possible a sealing of the compartments with respect to one another is secured by the construction of the vanes and their inserts, respectively, according to the invention. The rotary machine can be used as a circulation or feeder pump, compressor, blower, gearing, and also as a vacuum pump, as an engine or the like.

The machine according to the embodiment illustrated moreover offers the following advantages: the area sealing or at least multiple line sealing between the sealing faces of the inserts and the drum surface secures a faultless seal between the various compartments. This kind of seal allows to let the drum proper not to contact tightly on the cylindrical casing so that the space between the drum and the casing has a cross section not the shape of a crescent but of a closed ring, contracting at the lowest point. Thereby any friction between the drum and the rotating casing is completely obviated. A further advantage results from the rigid connection of any two diametrically opposite vanes, since thereby the centrifugal forces of two diametrically opposite vanes in respect of the drum surface are cancelling out one another. This makes sure that the vanes of sealing faces of their inserts, respectively, always contact the drum surface and slide upon the same. It is remarkable, that the rotary machine of the construction described, operates noiselessly and free from vibrations, and that oil separators are not required. Besides, the width of the vanes and of the inserts, respectively, depends on the purpose for which the machine is to be used. With machines for comparatively high pressures, e.g. compressors, the width of the vanes and inserts, respectively, will have to be chosen in general larger than with machines for comparatively small pressures, e.g. blowers, circulation pumps, etc. Tests have proved, that with compressors and similar machines vanes and inserts, respectively, have been found particularly favourable, the width of which is at least equal to their stroke. In order to render also the movement of the vanes sliding in the grooves of the casing upon rotation as friction-less as possible, the vanes can be supported in the grooves on rollers, for example on comparatively large machines.

In the embodiment illustrated and described, the oil conduits are so arranged that with a gaseous or vapourous medium, that is a medium of lower specific weight than the oil, upon rotation a separation of the oil takes place in the machine itself owing to centrifugal force, so that the medium is not contaminated by the oil.

While I have herein described and illustrated in the accompanying drawings what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. A rotary machine, comprising in combination: a stationary [outer mantle, a closure lid fixedly attached to said mantle] *structure,* a rotatable casing [arranged inside the said mantle and] journaled therein [and in the said closure lid], a *stationary* guide drum [stationarily secured to said mantle] *mounted on said structure* and arranged inside the said rotatable casing eccentrically with clearance from the inner wall surface thereof even at the nearest point, shaft portions extending axially from both ends of said stationary drum through the said rotatable casing, an inlet duct and a discharge duct being provided in said shaft portions and communicating with an inlet part and a discharge part, respectively, issuing from said drum into the eccentrical annular space between the said rotatable casing and stationary drum, [at the points of maximum and minimum clearances, respectively,] at least one pair of diametrically opposite vanes slidably guided in radial slots in the inner circumference of said rotatable casing, a bridge piece for each pair of vanes, said bridge pieces rigidly connecting the vanes of the co-ordinate pairs, respectively, with one another and going with ample clearance round the adjacent shaft portion extending from said stationary drum, and inserts fulcrumed in the end faces of said vanes for rocking motions about axes parallel to the axis of the said rotatable casing and contacting the circumference of the said drum, the said eccentrical annular space being divided into separate compartments sealed from one another by the said sliding vanes and inserts thereof, and, upon rotation of the said casing *periodically increasing and decreasing as to their capacities* [first increasing in volume from the said inlet part onwards, and then decreasing in volume towards the said discharge part], the said drum having a substantially elliptical cross section with the major axis at right angles to the eccentrical offset of the said stationary drum with respect to the said rotary casing and the sealing faces of the said inserts *where* contacting the surface of the said stationary drum, *having* in any position at least [with] a multiple line contact, [the] *any* gap between the said sealing faces and the surface of the drum being everywhere smaller than the thickness of the film of lubricant applied to it.

2. A rotary machine as claimed in claim 1, wherein the said bridge pieces establishing the said rigid connection between diametrical opposite vanes have an aperture surrounding the said shaft portion the diameter of which exceeds the diameter of the said shaft portion [so much that the center of said aperture coincides with the axis of the said drum].

3. A rotary machine as claimed in claim 1, wherein the said inserts protrude at least partly beyond the end faces of the said vanes facing towards the said drum.

4. A rotary machine as claimed in claim 1, wherein the said sealing faces of the said inserts sliding upon the said drum contact the surface of the said drum practically with an area contact.

5. A rotary machine as claimed in claim 1, wherein recesses parallel to the axis of rocking are provided in the sealing faces of the said inserts contacting the surface of the said stationary drum.

6. A rotary machine as claimed in claim 1, wherein the ratio of the offset of the centers of the said casing and drum to half the distance between diametrically opposite vanes does not exceed 0.2.

7. A rotary machine as claimed in claim 1, wherein the curvature of the sealing faces of the said inserts sliding upon the said elliptical drum is adapted to the smallest curvature of the surface thereof [, and wherein the circumferential width of the said inserts is so selected that the radial gap formed between the said inserts and the surface of said drum at the points of greatest curvature is narrower than the thickness of the said film of lubricant].

8. A rotary machine as claimed in claim 1, wherein the width of the said vanes and inserts thereof is at least equal to the full length of the radial sliding movement thereof.

9. A rotary machine as claimed in claim 1, wherein the width of the said vanes and inserts thereof is smaller than the full length of the radial sliding movement thereof.

10. A rotary machine as claimed in claim 1, wherein ducts are provided in the said casing putting the spaces in the said casing outside the said vanes into a pressure compensating communication with one another.

11. A rotary machine as claimed in claim 1, wherein the said vanes are subdivided in the axial direction of the said casing into at least two sections abutting on one another, each two diametrically opposite sections being rigidly connected with one another.

12. A rotary machine as claimed in claim 1, wherein further means are provided for sealing said space between said drum and said casing, said means comprising at least one resilient conical ring, at least one end face of the said drum facing the adjacent inner end face of the said casing being conically recessed, said ring being fitted into said recessed face and slotted adjacent the portion of the said eccentrical annular space in communication with the said inlet part.

13. A rotary machine as claimed in claim 1, having ducts for the lubricant arranged in the said shaft portions, stationary drum, inserts, vanes and rotatable casing tapped at the largest radius of the said casing whereby the lubricant is separated from a pumped medium of lower specific weight by centrifugal force.

*14. A rotary machine as claimed in claim 1, said stationary structure comprising a bipartite protective housing enveloping said casing, said housing forming at one of its ends a bearing for an extension of said casing, one of said shaft portions projecting through said extension of said casing, and said other shaft portion projecting through said housing and being secured thereto.*

*15. In a rotary machine, including a stationary slightly elliptical drum, and a casing rotatable about an axis eccentric to the axis of said drum so as to define an eccentric annular space between said drum and casing, at least one pair of diametrically opposite vanes rigidly connected to each other and slidable in radial slots provided in the*

*interior of said casing, said vanes being provided with part-circular recesses in their ends adjacent said drum, an insert for each vane, each insert having one round face engaging the recess of the associated vane and a portion projecting from said recess, said projecting portions having other faces, respectively, adjacent said drum, and constituting sealing faces with respect thereto, said inserts being adapted to rock in said recesses so as to adjust themselves automatically according to the different radii of curvature of the peripheral surface of said drum, wherein any gap between said sealing surfaces and the*

*circumferential drum surface is everywhere smaller than the thickness of the film of lubricant applied to it.*

References Cited in the file of this patent or the original patent

UNITED STATES PATENTS

| | | |
|---|---|---|
| 413,830 | Nichols | Oct. 29, 1889 |
| 727,749 | Cook | May 12, 1903 |
| 1,568,429 | Tyler | Jan. 5, 1926 |
| 2,015,307 | Hand | Sept. 24, 1935 |
| 2,258,077 | Taylor | Oct. 7, 1941 |